United States Patent
Kondo et al.

(10) Patent No.: US 11,958,388 B2
(45) Date of Patent: Apr. 16, 2024

(54) IN-VEHICLE SEAT

(71) Applicants: Toyota Jidosha Kabushiki Kaisha, Toyota (JP); Toyota Boshoku Kabushiki Kaisha, Kariya (JP)

(72) Inventors: Keiichi Kondo, Chiryu (JP); Kazuhisa Niimi, Nisshin (JP); Ryo Sato, Nisshin (JP)

(73) Assignees: TOYOTA JIDOSHA KABUSHIKI KAISHA, Toyota (JP); TOYOTA BOSHOKU KABUSHIKI KAISHA, Kariya (JP)

(*) Notice: Subject to any disclaimer, the term of this patent is extended or adjusted under 35 U.S.C. 154(b) by 413 days.

(21) Appl. No.: 17/387,389

(22) Filed: Jul. 28, 2021

(65) Prior Publication Data

US 2022/0097575 A1 Mar. 31, 2022

(30) Foreign Application Priority Data

Sep. 25, 2020 (JP) ................. 2020-161181

(51) Int. Cl.
*B60N 2/28* (2006.01)

(52) U.S. Cl.
CPC ................. *B60N 2/2821* (2013.01)

(58) Field of Classification Search
CPC .... B60N 2/2821; B60N 2/2887; B60N 2/289; B60N 2/646; B60N 2/28; B60N 2/26
See application file for complete search history.

(56) References Cited

U.S. PATENT DOCUMENTS

| | | | |
|---|---|---|---|
| 9,409,499 B2* | 8/2016 | Funaki | B60N 2/70 |
| 2001/0013716 A1 | 8/2001 | Hayashi et al. | |
| 2008/0238162 A1 | 10/2008 | Suzuki et al. | |
| 2012/0049590 A1 | 3/2012 | Parker | |
| 2013/0200599 A1* | 8/2013 | Shamoto | B60N 2/99 |
| | | | 280/730.2 |
| 2014/0042792 A1* | 2/2014 | Kajiwara | B60N 2/2809 |
| | | | 297/463.1 |
| 2018/0118065 A1 | 5/2018 | Okuhara et al. | |
| 2019/0217755 A1 | 7/2019 | Atragene et al. | |

FOREIGN PATENT DOCUMENTS

| | | |
|---|---|---|
| JP | 2003-226170 A | 8/2003 |
| JP | 2009-035132 A | 2/2009 |
| JP | 2010-208589 A | 9/2010 |
| JP | 2010-247822 A | 11/2010 |
| JP | 2018-069958 A | 5/2018 |
| JP | 2018-075955 A | 5/2018 |

* cited by examiner

*Primary Examiner* — Lori Lyjak
(74) *Attorney, Agent, or Firm* — Dinsmore & Shohl LLP

(57) ABSTRACT

An in-vehicle seat includes a seat back, a seat cushion, and an anchor for fixing a child seat. The seat cushion has a seat cushion base, a seat cushion pad that is removable from the seat cushion, and a supporting panel. The supporting panel is provided between the seat cushion base and the seat cushion pad, and serves as a placement face for the child seat. The anchor is provided at a position at which the anchor is covered and hidden by the seat cushion pad, and at which the anchor is externally exposed when the seat cushion pad is removed from the seat cushion. A guide groove that guides a linking portion protruding from the child seat to the anchor is provided in the supporting panel.

8 Claims, 4 Drawing Sheets

IN-VEHICLE SEAT

CROSS-REFERENCE TO RELATED APPLICATION

This application claims priority to Japanese Patent Application No. 2020-161181 filed on Sep. 25, 2020, incorporated herein by reference in its entirety.

BACKGROUND

1. Technical Field

The present specification discloses an in-vehicle seat capable of mounting a child seat.

2. Description of Related Art

Generally, in-vehicle seats each have a seat back that supports the back of a seat occupant, and a seat cushion that supports the buttocks of the seat occupant. Child seats have often been mounted on seat cushions of such in-vehicle seats. In such arrangements, in-vehicle seats are each provided with anchors that link to linking portions of the child seat placed on the seat, to hold the child seat. Such anchors are unaesthetic, and accordingly square tubes or caps to cover and hide the anchors when not in use were often provided. However, when such square tubes or caps are provided, this leads to a problem of an increased number of parts.

Japanese Unexamined Patent Application Publication No. 2009-035132 (JP 2009-035132 A) discloses an in-vehicle seat that covers and hides the anchors with a seat cushion, rather than providing caps or the like to hide the anchors. In JP 2009-035132 A, a plate on which a child seat can be placed is provided below the seat cushion. When attaching a child seat, the seat cushion is detached from the in-vehicle seat, thereby externally exposing the anchors and the plate. The child seat is placed on this plate, and the child seat is pressed toward the rear side of the seat, thereby linking the linking portion to the anchors.

SUMMARY

According to the technology of JP 2009-035132 A, caps for hiding the anchors are unnecessary, so increase in the number of parts can be suppressed. However, in JP 2009-035132 A, when fixing a child seat to the in-vehicle seat, the child seat needs to be pressed toward the anchor side while visually confirming the relative position between the linking portions of the child seat and the anchors provided in the in-vehicle seat, and fixing work tends to be cumbersome. Particularly, under environments in which visibility is poor, such as at night or the like, visually confirming the relative positional relation between the linking portions and the anchors is difficult, and accordingly fixing the child seat tends to be time-consuming.

Accordingly, the present specification discloses an in-vehicle seat that enables fixing of child seats more easily.

An in-vehicle seat according to an aspect of the disclosure includes a seat back that supports a back of a seat occupant, a seat cushion that supports buttocks of the seat occupant, and an anchor configured to fix a child seat. The seat cushion includes a seat cushion base, a seat cushion pad that is removable from the seat cushion, and a supporting panel, the supporting panel being provided between the seat cushion base and the seat cushion pad, and serving as a placement face for the child seat. The anchor is provided at a position at which the anchor is covered and hidden by the seat cushion pad attached to the seat cushion, and at which the anchor is externally exposed when the seat cushion pad is removed from the seat cushion. A guide groove that guides a linking portion protruding from the child seat to the anchor is provided in the supporting panel.

In the in-vehicle seat according to the above aspect, providing the guide groove in the supporting panel enables the linking portion to be easily guided to the anchor, even in situations in which visual confirmation of position is difficult. As a result, the child seat can be fixed to the in-vehicle seat more easily.

In the in-vehicle seat according to the above aspect, an inclination of a surface of the supporting panel in a front-rear direction may be greater than an inclination of a surface of the seat cushion pad in the front-rear direction.

Increasing the inclination of the supporting panel in the front-rear direction can certainly prevent the child seat from unintentionally tumbling off the supporting panel. On the other hand, the inclination of the seat cushion pad in the front-rear direction is kept small, whereby ensuring the seat comfort.

In the in-vehicle seat according to the above aspect, the surface of the seat cushion pad attached to the seat cushion may be substantially horizontal.

Also, in the in-vehicle seat according to the above aspect, the seat cushion may further include a seat cushion cushioning member that is disposed between the seat cushion base and the supporting panel, the seat cushion cushioning member being made of a foamed material.

In the in-vehicle seat according to the above aspect, a cut-out portion into which the anchor is inserted may be provided at a bottom face of the guide groove.

In the in-vehicle seat according to the above aspect, a width of the guide groove may be greater than a width of the anchor.

In the in-vehicle seat according to the above aspect, the anchor may include a pair of leg portions, and a middle portion that engages with the child seat. The leg portions may be extended from the seat cushion base upward and forward, and the middle portion may be located at substantially same height as the linking portion of the child seat.

In the in-vehicle seat according to the above aspect, a plurality of cut-out portions into which the anchor is inserted may be provided at a bottom face of the guide groove. Each of the cut-out portions may correspond to one of the leg portions of the anchor.

According to this configuration, impact in the gravitational direction is absorbed by the seat cushion cushioning member, and hence deformation or damage of the supporting panel can be effectively suppressed.

According to the in-vehicle seat according to the aspect of the disclosure, child seats can be fixed more easily.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
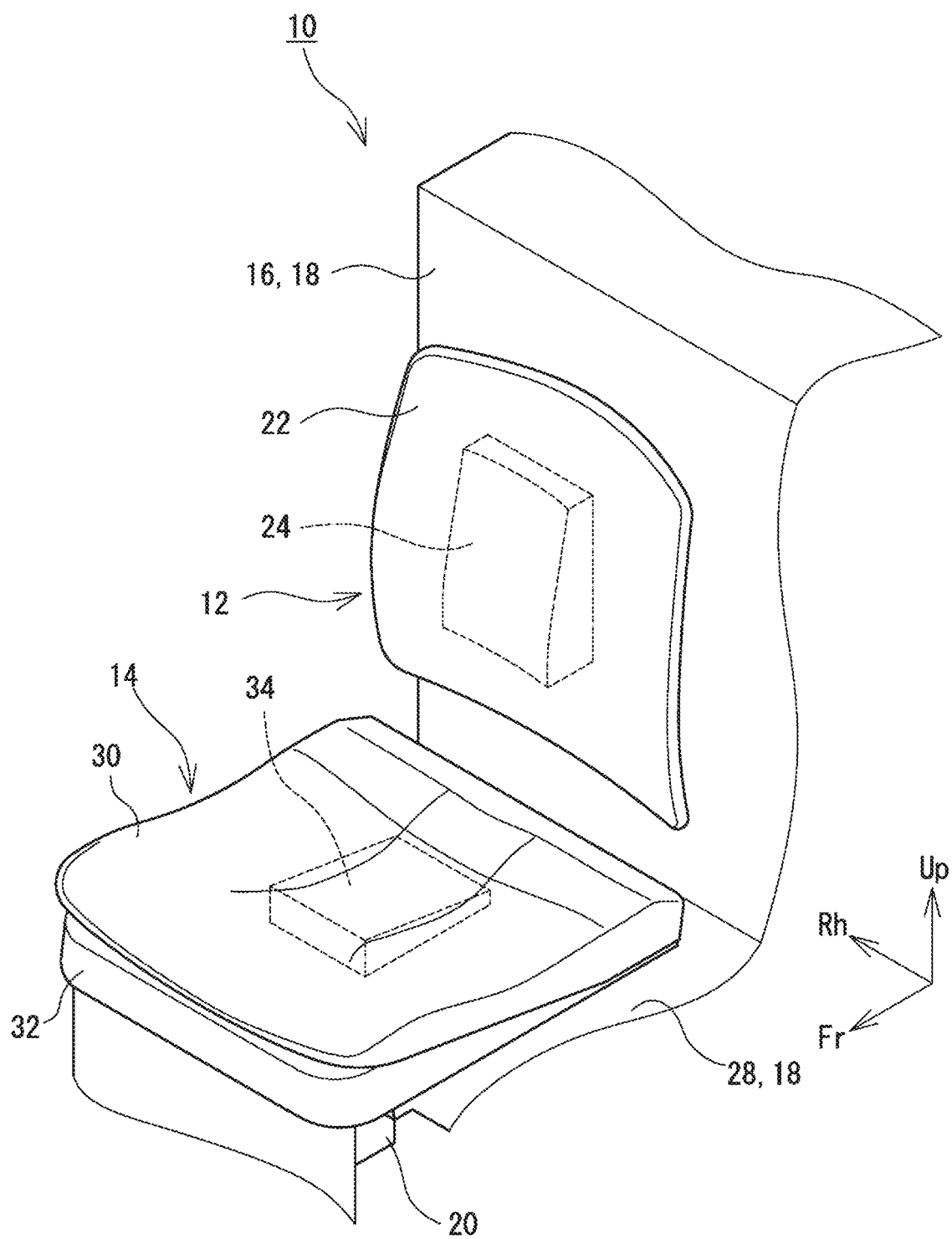
FIG. 1 is a perspective view of an in-vehicle seat.
Figure 2:
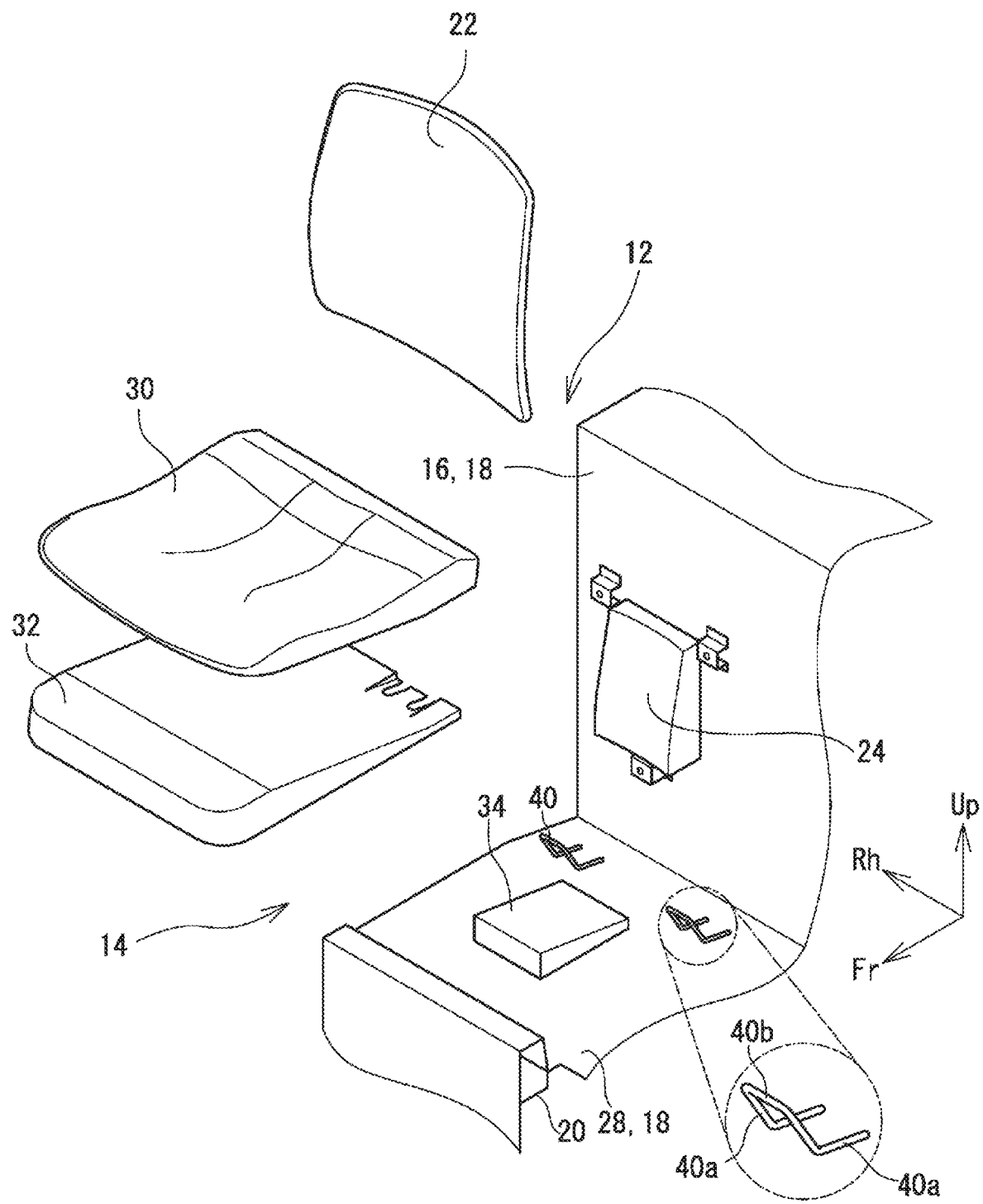
FIG. 2 is a disassembled perspective view of the in-vehicle seat.

A configuration of an in-vehicle seat 10 will be described below with reference to the drawings. FIG. 1 is a perspective view of the in-vehicle seat 10, and FIG. 2 is a disassembled perspective view of the in-vehicle seat 10. Note that in the drawings, Fr, Up, and Rh respectively indicate forward, upward, and rightward directions as viewed from a seat occupant. Also, the up-down and right-left directions in the following description are the up-down and right-left directions as viewed from the seat occupant, unless specifically stated otherwise.

This in-vehicle seat 10 is installed in a vehicle for an occupant of the vehicle to sit on. Although the type of vehicle in which the in-vehicle seat 10 is installed is not particularly limited, the in-vehicle seat 10 in this embodiment is installed in a vehicle that is ridden by unspecified passengers, such as a transit bus or the like, for example. Also, the orientation of installation of the in-vehicle seat 10 is not specified in particular. For example, the in-vehicle seat 10 may be installed to be oriented so that the seat occupant is facing the direction of travel of the vehicle, or may be installed to be oriented so that the direction of travel of the vehicle is the left direction or the right direction as seen from the seat occupant. A child seat 100 can be fixed to this in-vehicle seat 10, which will be described in detail later.

The in-vehicle seat 10 is provided with a seat back 12 that supports the back of the seat occupant, and a seat cushion 14 that supports the buttocks of the seat occupant. The seat back 12 further has a seat back base 16, a seat back panel 22, and a seat back cushioning member 24. Hereinafter, the seat back base 16, the seat back panel 22, and the seat back cushioning member 24 will be written as "SB base 16", "SB panel 22", and "SB cushioning member 24", respectively.

Figure 4:
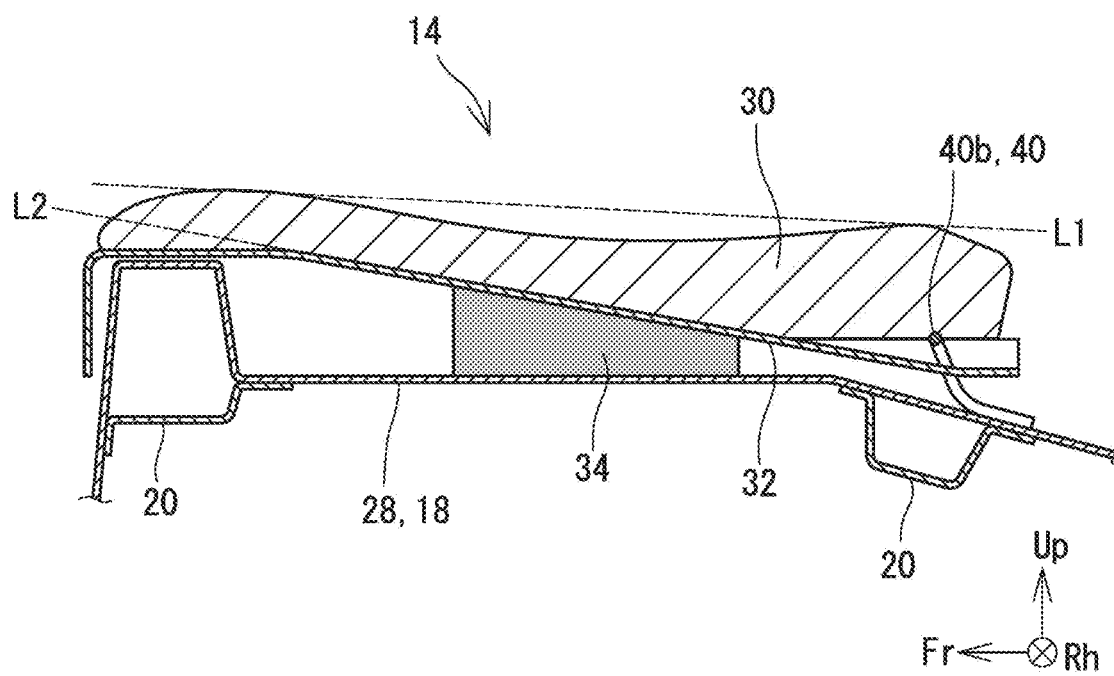
FIG. 4 is a cross-sectional view of a seat cushion on a plane along line IV-IV in FIG. 3.

The SB base 16 is a base member for supporting the load applied to the in-vehicle seat 10 through the SB panel 22. In this embodiment, the SB base 16 is a part of a body panel 18 making up a body of the vehicle, and is integrally formed with a later-described seat cushion base 28. The body panel 18 is made of a thin metal plate, and is joined to a structural member of the vehicle. The structural member may be configured as a completely separate member from the body panel 18, or part of the body panel 18 may function as part of the structural member. Accordingly, a structural member 20 that has a substantially rectangular cross-section may be configured by joining a panel member that has a substantially hat-like cross-section to the rear face of the body panel 18, as illustrated in FIG. 4, for example.

The SB panel 22 is disposed in front of the SB base 16, and functions as a so-called backrest, which is a portion with which the back of the seat occupant comes into contact. This SB panel 22 is a plate member made of resin. The SB panel 22 retains its shape to such an extent that the SB panel 22 does not deform even if the seat occupant leans back. This SB panel 22 is liquid-impenetrable, and accordingly can be easily cleaned by wiping with a wet cloth. The SB panel 22 is gently curved, to match the form of the back of the seat occupant. That is to say, the SB panel 22 is curved in a manner that the middle in the lateral direction protrudes backward and the back of the seat occupant can be suitably held. Also, the back of the human body normally has an S-shaped curvature in the up-down direction. The SB panel 22 is gently curved so that the middle in the up-down direction protrudes forward, so as to follow this curvature of the back of the seat occupant.

Now, in the in-vehicle seat 10 installed in a passenger car, a pad member made of a cushion material is often provided in the seat back 12. However, in this embodiment, no such pad member is provided in the seat back 12, and the configuration is made such that the back of the seat occupant comes into contact with the rigid SB panel 22. The reason for such a configuration is to maintain the seat back 12 in a sanitary state. That is to say, cushion materials that are materials for pad members have problems such as unclean matter (such as stain) readily seeping in, and once adhered, the unclean matter is not readily removed. On the other hand, the in-vehicle seat 10 of this embodiment is installed in a vehicle that is ridden by indeterminate passengers as described above, and accordingly there is strong demand to maintain the seat back 12 in a sanitary state. Hence, in this embodiment, a pad member that would readily allow adherence of unclean matter is not provided in the seat back 12, and the SB panel 22 that is a rigid resin panel is used as the backrest of the seat back 12. Unclean matter does not readily seep into the SB panel 22, which can be cleaned by wiping with a wet cloth or the like, and thus can be easily maintained in a sanitary state.

However, such a rigid SB panel 22 has a problem of poor impact absorption. That is to say, a pad member made of a cushion material is capable of absorbing a certain amount of impact acting on the seat occupant at the time of a collision, through deformation. On the other hand, the SB panel 22 is not capable of sufficiently absorbing impact at the time of a collision, and there has been concern of a greater load being applied to the seat occupant, and the SB panel 22 being irreversibly deformed or broken.

In order to avoid such a problem, the SB cushioning member 24 made of a foamed material is provided between the SB panel 22 and the SB base 16 in this embodiment. The SB cushioning member 24 is formed by a foamed material, such as expanded polypropylene or the like. The SB cushioning member 24 is disposed on the rear face of the SB panel 22 at the substantially middle thereof. The front face of the SB cushioning member 24 curves gently so as to follow the rear face of the SB panel 22.

When an impact load acts on the seat occupant in the rearward direction due to a vehicle collision, this SB cushioning member 24 exhibits compression deformation prior to damage of the SB panel 22, thereby absorbing the collision load. Consequently, irreversible deformation or damage of the SB panel 22 can be effectively suppressed. Also, the impact load is absorbed by the SB cushioning member 24, whereby effects of the collision on the back of the seat occupant can be reduced. Also, while having excellent impact absorbing functions, the SB cushioning member 24 is a foamed member and hence is extremely lightweight. Accordingly, providing the SB cushioning member 24 enables the weight of the in-vehicle seat 10 to be reduced, while maintaining excellent collision absorbing functions. Note that while only one SB cushioning member 24 is provided at a substantially middle portion of the SB panel 22 in this embodiment, the shape, number, and position of the SB cushioning member 24 may be changed as appropriate.

Next, the configuration of the seat cushion 14 will be described. The seat cushion 14 has the seat cushion base 28, a seat cushion pad 30, a supporting panel 32, and a seat cushion cushioning member 34. Note that hereinafter, the seat cushion base 28, the seat cushion pad 30, and the seat cushion cushioning member 34 will be written as "SC base 28", "SC pad 30", and "SC cushioning member 34", respectively.

The SC base 28 is a base member for supporting a load applied to the in-vehicle seat 10 through the seat cushion 14. In this example, the SC base 28 is a part of the body panel 18 making up the body of the vehicle, in the same way as the SB base 16, and is integral with the SB base 16. The SC base 28 may also be joined to a structural member of the vehicle as necessary.

The SC pad 30 is a pad made of a cushion material, such as urethane foam or the like. This SC pad 30 is provided to disperse body contact pressure of the seat occupant, and to improve comfortability. Now, the seat back 12 is not provided with a pad member from a sanitary perspective. Omitting the pad member from the seat cushion 14 in the same way is also conceivable, but more body contact pressure is applied to the seat cushion 14 as compared to the seat back 12. When the pad member is omitted from this seat cushion 14, the comfortability of the seat occupant is markedly diminished. Accordingly, the SC pad 30 that disperses body contact pressure of the seat occupant is provided in the seat cushion 14. This SC pad 30 has a problem of unclean matter readily seeping in as compared to the SB panel 22, but the SC pad 30 is detachable from the seat cushion 14, as will be described later. Accordingly, when unclean matter adheres to the SC pad 30 or some other like situation occurs, the SC pad 30 can be removed from the seat cushion 14 and washed or replaced with a new SC pad 30, thereby maintaining a certain level of sanitation or higher.

Figure 3:
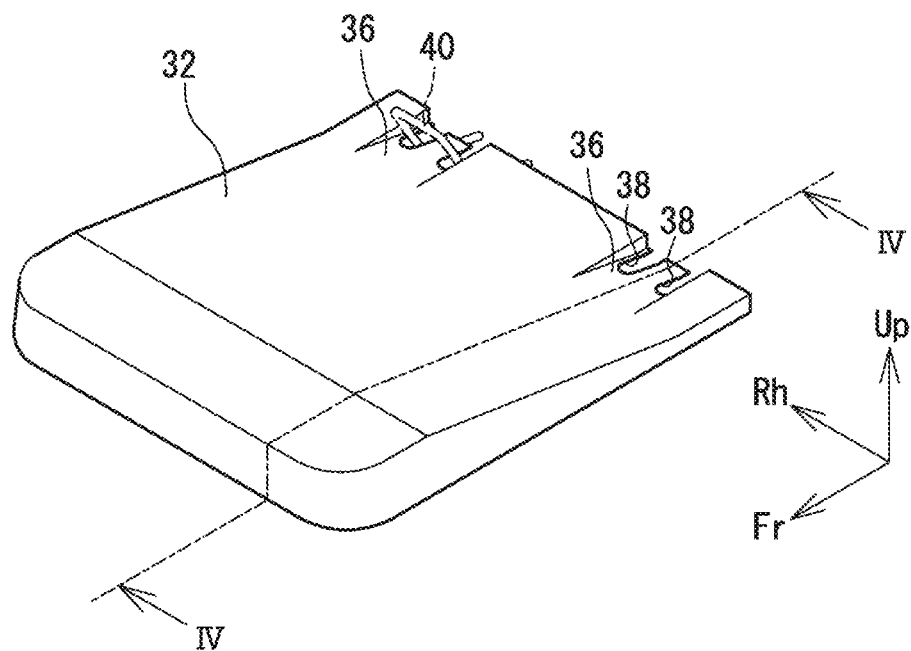
FIG. 3 is a perspective view of a support panel.

FIG. 3 is a perspective view of the supporting panel 32, and FIG. 4 is a cross-sectional view of the seat cushion 14 on a plane along line IV-IV in FIG. 3. The SC pad 30 is detachably mounted to the seat cushion 14. In a mounted state in which the SC pad 30 is mounted to the seat cushion 14, the SC pad 30 can cover and hide the supporting panel 32, as illustrated in FIGS. 1 and 4. Also, anchors 40 for fixing a child seat are provided in the seat cushion 14, as will be described later. In a mounted state, the SC pad 30 can cover and hide the anchors 40, as illustrated in FIG. 4. When the SC pad 30 is removed from the seat cushion 14 and is in a detached state, the supporting panel 32 and the anchors 40 are externally exposed.

Also, the surface of the SC pad 30 is gently recessed at the middle thereof in the front-rear direction, so as to follow the form of the buttocks of the seat occupant, as illustrated in FIG. 4. Thus, the buttocks of the seat occupant can be suitably held. Also, an inclination L1 of the SC pad 30 in the front-rear direction is an upward inclination toward the front. The inclination L1 of the SC pad 30 here means the inclination of a flat plate when the flat plate is placed on the SC pad 30 in a mounted state, and is represented by a straight line connecting the apex of the front portion of the SC pad 30 and the apex of the rear portion thereof in the example in FIG. 4. The inclination L1 of the SC pad 30 in the front-rear direction is gentler than an inclination L2 of the supporting panel 32 in the front-rear direction, i.e., the inclination L1 is at an angle close to horizontal.

Figure 5:
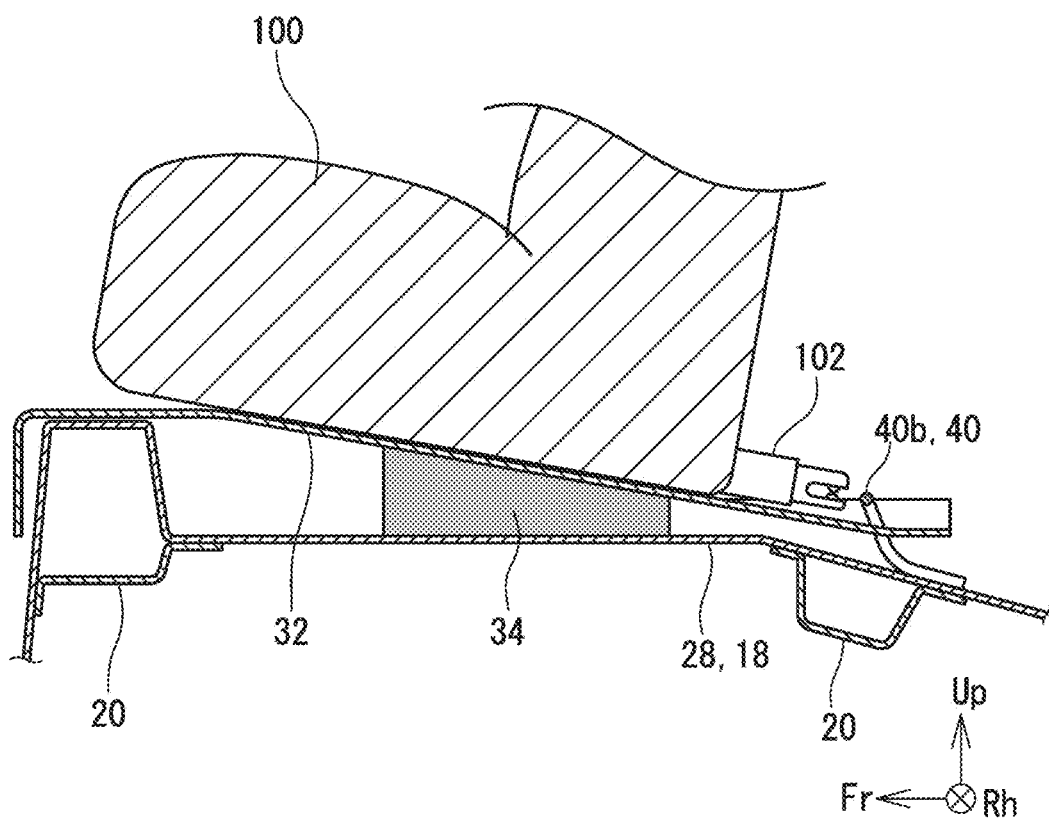
FIG. 5 is a cross-sectional view showing a child seat is fixed.

The supporting panel 32 is a resin member provided between the SC base 28 and the SC pad 30. The upper face of the supporting panel 32 is a placement face on which the child seat 100 is placed, as illustrated in FIG. 5. FIG. 5 is a cross-sectional view showing the child seat 100 is fixed to the in-vehicle seat 10. An area around the front end of the upper face of the supporting panel 32 is a substantially horizontal face, but a large part other than that area incline upward toward the front. Accordingly, the inclination L2 of the supporting panel 32 in the front-rear direction (see FIG. 4), i.e., the inclination of a flat plate when the flat plate is placed on the supporting panel 32, is an upward inclination toward the front. Note that the inclination of the placement face is stipulated by law, to prevent the child seat 100 from tumbling off of the placement face. The inclination L2 of the supporting panel 32 is set so as to satisfy such standards stipulated by law, and is greater than the inclination L1 of the SC pad 30 in the front-rear direction.

Note that placing the child seat 100 on the SC pad 30 instead of on the supporting panel 32 is conceivable, but in this case, the inclination L1 of the SC pad 30 in the front-rear direction needs to be increased to satisfy the standards stipulated by law. In this case, although the child seat 100 can be stably placed, the comfort of sitting on the seat cushion 14 is diminished. The configuration in which the SC pad 30 is detachable, and the child seat 100 is placed on the supporting panel 32 provided on the lower side of the seat cushion 14 as in this embodiment, enables maintaining the comfort of sitting on the seat cushion 14 (i.e. the SC pad 30 is approximately horizontal), while the child seat 100 can be stably fixed.

Guide grooves 36 and cut-out portions 38 are formed in the proximity of the rear end of the supporting panel 32, as illustrated in FIG. 3. The anchors 40 will be described before describing the guide grooves 36 and the cut-out portions 38. The anchors 40 are members that engage with linking portions 102 (see FIG. 5) that protrude from the child seat 100, thereby fixing the child seat 100 to the in-vehicle seat 10. A standard called ISOFIX is in widespread use regarding fixing the child seat 100. An ISOFIX-compliant child seat 100 has bar-like linking portions 102 provided on the rear end thereof, as illustrated in FIG. 5. The anchors 40 are metal fittings with which these linking portions 102 can engage. The anchors 40 are configured by bending wires into a substantially downward letter-U shape, as illustrated in FIG. 2, each including a pair of leg portions 40a and a middle portion 40b connecting these leg portions 40a. Basal ends of the leg portions 40a (i.e., end portions on the opposite side from the middle portion 40b) are fixed to the SC base 28 by welding or the like, and the leg portions 40a extend from the SC base 28 upward and forward. The middle portion 40b is a part with which the linking portion 102 engages, and is positioned at substantially the same height as the linking portion 102 of the child seat 100 placed on the supporting panel 32. Two of such anchors 40 are provided in the proximity of the rear end of the seat cushion 14, with a spacing therebetween in the right-left direction.

The guide grooves 36 are respectively provided at portions of the supporting panel 32 corresponding to the anchors 40, i.e., in the proximity of both right and left ends in the proximity of the rear end of the supporting panel 32. The cut-out portions 38 into which the leg portions 40a of the anchors 40 are inserted are provided at the bottom faces of the guide grooves 36. More specifically, a plurality of cut-out portions 38 are provided, with each of the cut-out portions 38 corresponding to one of the leg portions 40a of the anchors 40. The guide grooves 36 are grooves that extend in the front-rear direction, and that gradually increase in depth toward the rear end. The guide grooves 36 have widths slightly larger than the anchors 40. Accordingly, once the linking portions 102 of the child seat 100 enter the guide grooves 36, positions of the linking portions 102 relative to the anchors 40 will not be greatly deviated, and thus the linking portions 102 can be easily linked to the anchors 40. As a result, the linking portions 102 can be linked to the anchors with relative ease, even in situations in which visually confirming the positional relation is difficult, such as at night or the like.

Now conventionally, in many vehicles, the anchors 40 are surrounded by square tubes to hide the anchors 40, or caps are provided to cover and hide openings that have access to the anchors 40, due to design-related reasons. However, providing such square tubes or caps leads to a problem of an increase in the number of parts. In this example, the anchors 40 are provided at positions at which the anchors 40 are covered and hidden by the SC pad 30 mounted to the seat cushion 14. As a result, there is no need to provide square tubes or caps separately, and the number of parts can be kept low. Also, the anchors 40 protrude greatly from the supporting panel 32, and accordingly the user can easily recognize the positions of the anchors 40 when the SC pad 30 is removed from the seat cushion 14. As a result, the work of fixing the child seat 100 can be simplified by this embodiment.

The SC cushioning member 34 is provided between the supporting panel 32 and the SC base 28. The SC cushioning member 34 is formed by a foamed material, such as expanded polypropylene or the like, in the same way as the SB cushioning member 24. This SC cushioning member 34 is located at a substantially middle portion of the supporting panel 32, and the surface thereof inclines upward toward the front, along the supporting panel 32. Providing this SC cushioning member 34 enables load in the vertical direction to be absorbed, while keeping the in-vehicle seat 10 lightweight. Absorbing the load in the vertical direction by the SC cushioning member 34 enables deformation or damage of the supporting panel 32 to be effectively suppressed. Note that the number, shape, and position of the SC cushioning member 34 may be changed as appropriate.

When fixing the child seat 100 to the in-vehicle seat 10, the SC pad 30 is removed from the seat cushion 14, and the child seat 100 is placed on the supporting panel 32, as illustrated in FIG. 5. At this time, the supporting panel 32 greatly inclines upward toward the front, and accordingly the child seat 100 also inclines upward toward the front. As a result, the child seat 100 readily advances in a direction toward the seat back 12 under its own weight, and the child seat 100 can be certainly prevented from unintentionally tumbling off the supporting panel 32.

Once the child seat 100 is placed on the supporting panel 32, the person performing the work presses the child seat 100 toward the seat back 12 side until the linking portions 102 come into contact with and engage with the anchors 40. At this time, the linking portions 102 protrude from the rear end of the child seat 100, and once these linking portions 102 enters the guide grooves 36 the positions of the linking portions 102 relative to the anchors 40 are naturally regulated. As a result, even in situations in which the positional relation is not easily visually confirmable, the linking portions 102 can be easily linked to the anchors 40, and thus the child seat 100 can be easily fixed.

As can be clearly understood from the description above, this embodiment has a configuration in which the supporting panel 32 and the anchors 40 are externally exposed by removing the SC pad 30 from the seat cushion 14, and further, the guide grooves 36 that guide the linking portions 102 to the anchors 40 are provided in the supporting panel 32. According to this configuration, the child seat 100 can be easily fixed to the in-vehicle seat 10. Note that the configuration described so far is an example, and as long as the supporting panel 32 and the anchors 40 are externally exposed by removing the SC pad 30 from the seat cushion 14, and the supporting panel 32 is provided with the guide grooves 36 that guide the linking portions 102 to the anchors 40, other configurations may be changed as appropriate. For example, the SB cushioning member 24 and the SC cushioning member 34 may be omitted. Also, no pad member is provided in the seat back 12 in the above-described embodiment, but some sort of pad member may be provided in the seat back 12, instead of or in addition to the SB panel 22.

What is claimed is:

1. An in-vehicle seat comprising:
a seat back that supports a back of a seat occupant;
a seat cushion that supports buttocks of the seat occupant; and
an anchor configured to fix a child seat, wherein:
the seat cushion includes a seat cushion base, a seat cushion pad that is removable from the seat cushion, and a supporting panel, the supporting panel being provided between the seat cushion base and the seat cushion pad and serving as a placement face for the child seat;
the anchor is provided at a position at which the anchor is covered and hidden by the seat cushion pad attached to the seat cushion, and at which the anchor is externally exposed when the seat cushion pad is removed from the seat cushion; and
a guide groove that guides a linking portion protruding from the child seat to the anchor is provided in the supporting panel.

2. The in-vehicle seat according to claim 1, wherein an inclination of a surface of the supporting panel in a front-rear direction is greater than an inclination of a surface of the seat cushion pad in the front-rear direction.

3. The in-vehicle seat according to claim 2, wherein the surface of the seat cushion pad attached to the seat cushion is substantially horizontal.

4. The in-vehicle seat according to claim 1, wherein the seat cushion further includes a seat cushion cushioning member that is disposed between the seat cushion base and the supporting panel, the seat cushion cushioning member being made of a foamed material.

5. The in-vehicle seat according to claim 1, wherein a cut-out portion into which the anchor is inserted is provided at a bottom face of the guide groove.

6. The in-vehicle seat according to claim 1, wherein a width of the guide groove is greater than a width of the anchor.

7. The in-vehicle seat according to claim 1, wherein:
the anchor includes a pair of leg portions, and a middle portion that engages with the child seat,
the leg portions extend from the seat cushion base upward and forward; and
the middle portion is located at substantially same height as the linking portion of the child seat.

8. The in-vehicle seat according to claim 7, wherein:
a plurality of cut-out portions into which the anchor is inserted are provided at a bottom face of the guide groove; and
each of the cut-out portions corresponds to one of the leg portions of the anchor.

* * * * *